Aug. 13, 1929.  G. WEBB  1,724,150
LINK BELT CONVEYER
Original Filed Dec. 23, 1926
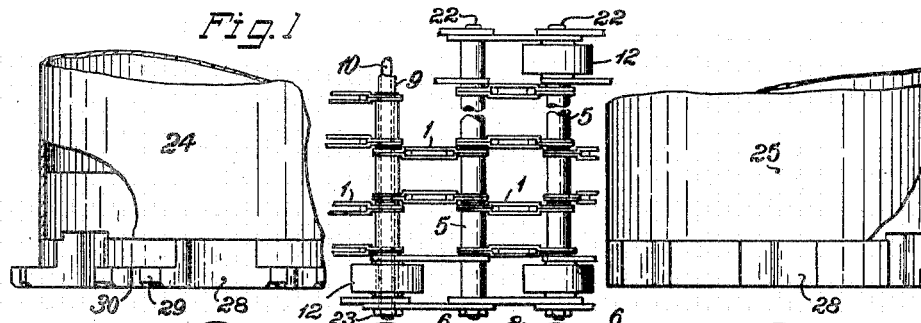
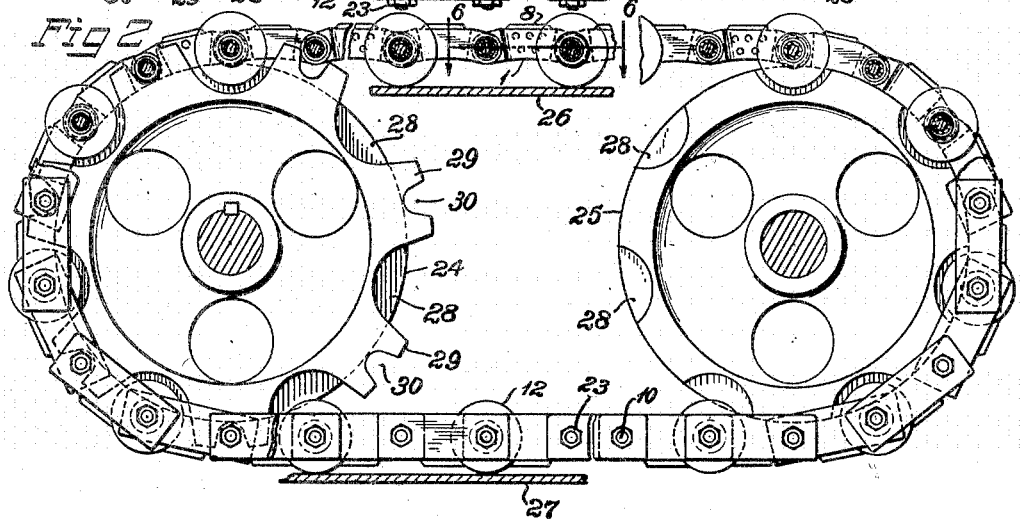
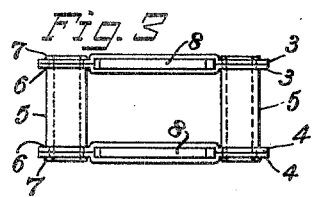
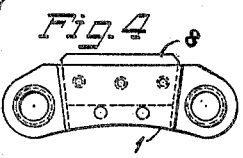
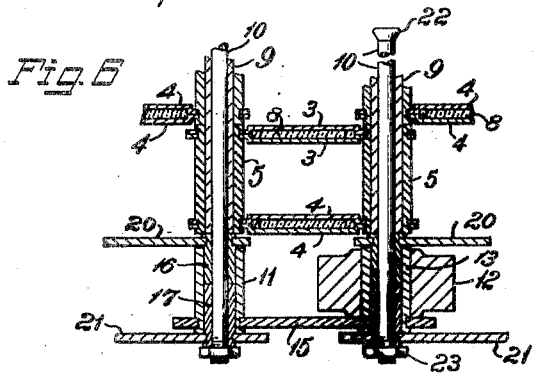
Inventor
George Webb,
By S. Jay Teller
Attorney Patented Aug. 13, 1929.

1,724,150

UNITED STATES PATENT OFFICE.

GEORGE WEBB, OF WEST HARTFORD, CONNECTICUT, ASSIGNOR TO COLT'S PATENT FIRE ARMS MANUFACTURING COMPANY, OF HARTFORD, CONNECTICUT, A CORPORATION OF CONNECTICUT.

LINK BELT CONVEYER.

Original application filed December 23, 1926, Serial No. 156,568. Divided and this application filed June 15, 1927. Serial No. 199,089.

The invention relates particularly to a link belt conveyer adapted to form a part of a machine for washing dishes or other articles such, for instance, as shown in my co-pending application Serial No. 156,568, filed December 23, 1926, which has resulted in Patent No. 1,719,410, dated July 2, 1929. This present application is a division of the said copending application.

Another object of the invention is to provide in association with the article carrying links of the belt supplemental means at the sides thereof and preferably including auxiliary links whereby belt supporting rollers may be provided and whereby the belt may be engaged and driven by a suitable sprocket wheel.

A further object of the invention is to provide in combination with a belt of the type described supporting drums having pockets or recesses therein to receive the rollers so that the rollers are prevented from supporting the belt as it passes around the drum.

Still further objects of the invention will be apparent from the following specification and claims.

In the accompanying drawing I have shown the embodiment of the invention which I now deem preferable but it will be understood that the drawing is intended for illustrative purposes only and is not to be construed as limiting or defining the scope of the invention, the claims forming a part of this specification being relied upon for that purpose.

Of the drawing:

Fig. 1 is a fragmentary plan view showing a section of a conveyer belt embodying the invention and also showing portions of the drums over which the belt is adapted to pass.

Fig. 2 is a side view partly in section with certain parts broken away, this view showing the two drums and also showing the belt passing around the drums.

Figs. 3 and 4 are plan and side views respectively, on an enlarged scale, showing one of the links of the conveyer.

Fig. 5 is a plan view on the same scale as Figs. 3 and 4 showing one set of auxiliary links such as are provided at the sides of the belt.

Fig. 6 is a fragmentary sectional view on the same scale as Figs. 3, 4, and 5, this view being taken along the line 6—6 of Fig. 2.

As shown most clearly in Figs. 1 and 2 the link belt proper comprises a series of transverse rows of links 1, 1 arranged with the links of each two adjacent rows in staggered relationship to each other. While I do not narrowly limit myself as concerns the details of construction of the links I prefer the construction which is shown in detail in Figs. 3 and 4. As illustrated each link comprises two pairs of metal strips 3, 3 and 4, 4 which are connected together by means of bushings 5, 5. Each bushing is shouldered at each end at 6 and is provided with a reduced portion which extends through apertures in the corresponding strips 3, 3 or 4, 4 and is spun or riveted over at 7. The strips of each pair, 3, 3, and 4, 4, are spaced apart between the bushings 5, 5 so as to receive between them a plate or carrier element 8 of a suitable material. The two plates or elements 8, 8 held by the strips 3, 3, and 4, 4 project upward above the other parts of the link, being thus adapted to support dishes or other articles which are to be carried by the conveyer. When used in a dish-washing machine the elements 8, 8 are ordinarily formed of a fibrous or non-metallic material.

The links of each two adjacent rows are so arranged that the openings or apertures through the adjacent bushings 5, 5 of the two rows are in alignment with each other. Tubes 9, 9 are provided which extend through the aligned apertures of the several rows of links these tubes serving as pivotal connecting means for the links of the several rows. The length of each tube 9 is slightly in excess of the aggregate width of the several links with which it engages and tie rods 10, 10 are provided which extend through the respective tubes. I provide means carried by the respective tie rods adjacent the ends of the tubes for preventing movement of the links transversely beyond the said ends. Thus the tubes and tie rods serve as pivot elements as already stated and the tie rods with the said means carried thereby serve to prevent the links from moving transversely out of their proper relationship to each other and to the tubes.

The means carried by the rods for preventing the transverse movement of the links may be varied but I prefer a construction which is such that some of the pivot elements, particularly the tie rods thereof, also carry at their ends bushings adapted to be engaged by a sprocket wheel for the purpose of driving the belt. As illustrated each alternate rod 10 carries a sprocket engaging bushing 11 preferably mounted in the manner to be hereinafter described in detail. I also prefer to provide a construction which is such that some of the rods carry rollers at their ends which rollers are adapted to engage suitable rails for supporting the belt. As shown each remaining alternate rod 10 carries a roller 12 which is mounted in the manner to be hereinafter described in detail.

The roller 12 is ordinarily formed of metal and preferably it is rotatably mounted upon a bushing 13 which is or may be the same in construction as the bushing 11. These two bushings 11 and 13 form parts of an auxiliary connecting link 14, this link comprising in addition to the said bushings a body plate 15. It is sometimes desirable to electrically insulate the conveyer from other parts of the machine, and in such cases the rollers 12, 12 may be formed of suitable insulating material.

The two bushings 11 and 13 surround the corresponding ends of the corresponding tie rods 10, 10 but instead of being directly mounted upon the tie rods they are mounted upon bushings 16 and 17 which form parts of auxiliary half links 18 and 19 as shown in detail in Fig. 5. Each half link 18 comprises in addition to the two bushings 16, 16 a body plate 20 and each half link 19 comprises in addition to the two bushings 17, 17 a body plate 21. When the two half links are assembled as shown in Fig. 6 the adjacent ends of each two bushings 16 and 17 engage each other and the inner end of each bushing 16 engages the outer end of the corresponding tube 9. The outer end of each bushing 17 is engaged either by a head 22 or a nut 23 on the corresponding tie rod 10. It will be seen that by tightening the corresponding nut 23 each tie rod serves to rigidly connect the corresponding tube with the two bushings 16 and 17 at each end thereof. As already stated the length of each tube is somewhat greater than the aggregate width of the links with which it engages and the links are thus left free for pivotal movement on the tube. The aggregate length of each two bushings 16 and 17 between the corresponding plates 20 and 21 is slightly greater than the total length of the corresponding bushing 11 or 13 and accordingly the connecting link 14 is free for pivotal movement on the said bushings 16 and 17.

In Figs. 1 and 2 of the drawing are shown two cylindrical drums 24 and 25 for supporting and guiding the link belt as a whole. For supporting the belt between the drums rails 26 and 27 are provided these being located in position to engage the rollers 12, 12 as clearly shown in Fig. 2. Preferably each drum is provided at each end with recesses 28, 28 for receiving the several rollers 12 so that the rollers will be entirely clear during the passage of the belt around each drum. The several links 1, 1 of the belt directly engage the periphery of the drum and the rollers 12, 12 have no function while the belt is supported by the drums.

Preferably for the purpose of driving the belt one of the drums as for instance drum 24 is provided with sprocket teeth 29, 29. As illustrated each sprocket tooth 29 is provided with an opening 30 adapted to receive one of the bushings 11, the bushing being engaged by one wall of the opening for the purpose of driving the conveyer. From an inspection of Fig. 2 it will be clear that each recess 30 is of sufficient depth to avoid any possibility of the bushing 11 engaging the bottom thereof.

What I claim is:

1. In a link belt for a conveyer, the combination of a series of transverse rows of transversely apertured links arranged with the links of each two adjacent rows in staggered relationship to each other and having their corresponding apertures in alignment with each other, tubes respectively extending through and approximately fitting the aligned apertures of the several rows of links and serving as pivots therefor, tie rods extending through the respective tubes, a series of pairs of half links at each side of the belt, each half link including two bushings fitting two adjacent rods and the bushings of the two links of each pair engaging each other, and connecting links each including two bushings respectively surrounding and fitting the adjacent bushings of two adjacent pairs of half links, one of the bushings of each connecting link being adapted for engagement with a driving sprocket.

2. In a link belt for a conveyer, the combination of a series of transverse rows of transversely apertured links arranged with the links of each two adjacent rows in staggered relationship to each other and having their corresponding apertures in alignment with each other, tubes respectively extending through and approximately fitting the aligned apertures of the several rows of links and serving as pivots therefor, tie rods extending through the respective tubes, a series of pairs of half links at each side of the belt, each half link including two bushings fitting two adjacent rods and the bushings of the two links of each pair engaging each other, connecting links each including two bushings respectively surrounding and fitting the adjacent bushings of two adjacent pairs of half links, one of the bushings of each connecting link being adapted for engagement with a driving sprocket, and belt supporting rollers rotatably mounted respectively on the remaining bushings of the connecting links.

3. In a link belt conveyer, the combination of an endless series of transverse rows of transversely apertured links arranged with the links of each two adjacent rows in staggered relationship to each other and having their corresponding apertures in alignment with each other, pivot elements respectively extending through the aligned apertures of the several rows of links, belt supporting rollers carried respectively by some of the said pivot elements at opposite ends thereof, two cylindrical supporting drums for the belt, each drum being provided with roller receiving recesses which permit the said links of the belt to directly engage the peripheries of the drums, and rails for engaging the rollers between the drums to support the belt.

4. In a link belt conveyer, the combination of an endless series of transverse rows of transversely apertured links arranged with the links of each two adjacent rows in staggered relationship to each other and having their corresponding apertures in alignment with each other, tubes respectively extending through and approximately fitting the aligned apertures of the several rows of links and serving as pivots therefor, tie rods extending through the respective tubes, means carried by the respective tie rods adjacent the ends of the tubes for preventing movement of the links transversely beyond the ends of the tubes, belt supporting rollers carried respectively by some of the tie rods at opposite ends thereof and beyond the ends of the tubes, two cylindrical supporting drums for the belt, each drum being provided with roller receiving recesses which permit the said links of the belt to directly engage the peripheries of the drums, and rails for engaging the rollers between the drums to support the belt.

5. In a link belt conveyer, the combination of an endless series of transverse rows of transversely apertured links arranged with the links of each two adjacent rows in staggered relationship to each other and having their corresponding apertures in alignment with each other, pivot elements respectively extending through the aligned apertures of the several rows of links, belt supporting rollers carried respectively by some of the said pivot elements at opposite ends thereof, sprocket engaging bushings carried respectively by the remaining pivot elements at opposite ends thereof, two cylindrical supporting drums for the belt, each drum being provided with roller receiving recesses which permit the said links of the belt to directly engage the peripheries of the drums and one of them being provided with sprocket teeth engaging the aforesaid bushings, and rails for engaging the rollers between the drums to support the belt.

In testimony whereof I have hereunto set my hand this 15th day of June, 1927.

GEORGE WEBB.